F. M. LINDERMAN.
BELT FASTENER.
APPLICATION FILED AUG. 5, 1914.
1,137,409.
Patented Apr. 27, 1915.
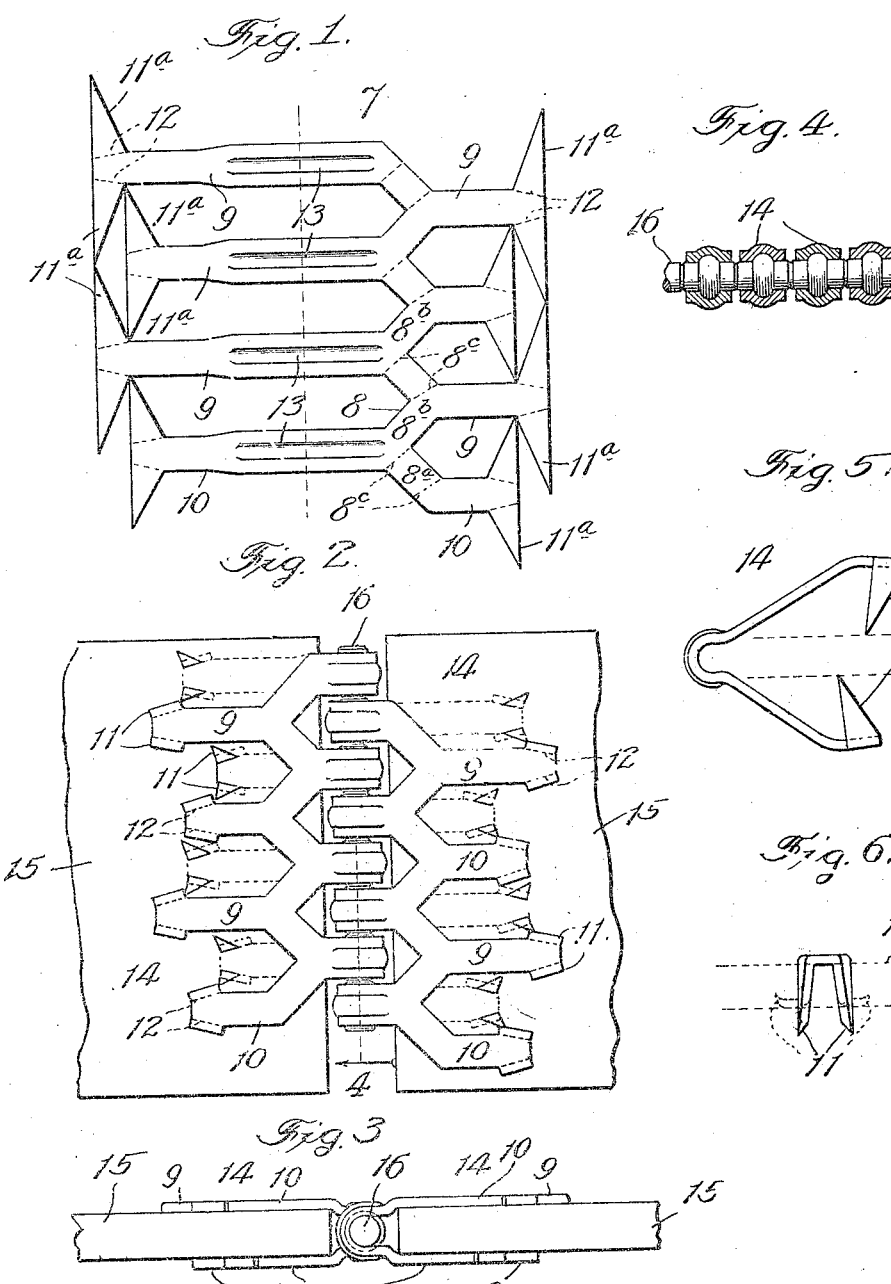

UNITED STATES PATENT OFFICE.

FRANK M. LINDERMAN, OF CHICAGO, ILLINOIS.

BELT-FASTENER.

1,137,409. Specification of Letters Patent. Patented Apr. 27, 1915.

Application filed August 5, 1914. Serial No. 855,255.

*To all whom it may concern:*

Be it known that I, FRANK M. LINDERMAN, a citizen of the United States, residing at Chicago, in the county of Cook and State of Illinois, have invented a new and useful Improvement in Belt-Fasteners, of which the following is a specification.

My invention relates to an improvement in the class of fasteners or hooks employed for fastening together the ends of machinery-belts; and it relates, as more particularly stated, to an improvement in the type of such hooks involving two series of arms extending in staggered relation from the opposite edges of a joining medium, or bar, to embrace, jaw-like, an end of the belt to be fastened, the arms terminating in prongs to penetrate the material of the belt near its end and be clenched on opposite sides thereof. Where this type of fastener is used, two of the belt-hooks, each in a continuous length, or in sections, are ordinarily employed to extend in opposite directions from a pintle to engage their prongs with the respective belt-ends to be joined.

The more important objects of my improvement are to duplicate the pointed prongs on each arm and so form their junction with the latter that when the prongs are driven through the belt those of each pair will spread apart at the opposite surface of the belt to securely and automatically clench the hook in place; and to so provide the scorings in the junction between oppositely extending arms that they may there be readily broken apart, for shortening a hook, but will not weaken the structure to impair it for resisting the strains to which it is subjected in use.

My further object is to provide a generally improved construction of belt-hook.

In the accompanying drawing, Figure 1 is a plan view of a blank stamped out of flexible sheet-metal and adapted to be formed, by bending, into my improved article; Fig. 2 is a plan view showing ends of a belt fastened by two of my improved belt-hooks hinged together; Fig. 3 is an end view of the showing in Fig. 2; Fig. 4 is a section on line 4, Fig. 2; 5 is a view in end elevation of one of the hooks, and Fig. 6 is a view showing a pair of hook-prongs penetrating through the belt, and representing by dotted illustration the protruding ends spread apart and clenched against the obverse belt-surface.

The blank 7 (Fig. 1), stamped out of flexible sheet-metal, comprises a continuous junction-bar 8 of general zig-zag shape formed of successive sections $8^a$ and $8^b$ extending diagonally with relation to each other. Each section $8^a$ is provided in one face, near its opposite ends, with diagonally-extending scores $8^c$ to weaken and facilitate breaking out of any such section for shortening the length of a hook formed of the blank as hereinafter explained. From the opposite apexes of the bar extends, on each side thereof, a series of successively longer and shorter arms 9 and 10, whereby the arms on one side are in staggered relation to those on the opposite side of their intermediate junction 8. Each arm terminates at its outer end in a pair of oppositely projecting prong-forming points $11^a$, the members of each pair being adapted to be bent, to form the prongs hereinafter described, at their junctions with the arms along the diagonal lines represented at 12, which converge outwardly. The arms on one side of the bar are shown to be relatively wider, throughout a portion of their length, than those on the opposite side, and to be longitudinally grooved as shown at 13, the grooves being formed as concavo-convex depressions.

To form a blank into a belt-hook 14, the members of each pair of the points $11^a$ are bent toward each other along the diagonal lines 12 to extend as represented in Figs. 2 and 5 and form the prongs 11, and the blank is bent upon itself at the grooved arms, at points midway between the ends of the grooves, to produce the configuration of belt-hook illustrated in Fig. 5.

Two of the hooks 14 are required for joining ends of a belt 15, and they are connected between those ends by a pintle 16, of metal or other suitable material, which is preferably, like that shown in my Letters Patent No. 982,374, dated January 24, 1911, of the corrugated form illustrated, to fit the rounded bearings formed at the inner end of each hook by the opposing sections of the grooves 13 and thereby prevent longitudinal displacement of the pintle. The hooks thus extend in opposite directions hingedly from and intermesh with each other along the pintle, as represented. In that position, each hook or fastener is adapted to embrace one end of a belt with the arms extending at varying distances along the same, whereby when the prongs are driven into the belt they engage it at those distances from the end to enhance the security of the hold of the hook. In driving the prongs, which is ordinarily done upon a suitable anvil, their diagonal connection at 12 with the arms causes the members of each pair to spread outwardly at their end-portions projecting beyond the belt and be self-clenched in that spread condition against the adjacent belt-surface, whereby the fastening is rendered secure.

As will be seen, the strains exerted transversely on the hooks in running over crown-faced pulleys about which the belt may be guided, would tend to break the hooks at the scores in the bar 8, where they extend, as they ordinarily do, parallel with the arms; but where the scores extend diagonally, in accordance with my improvement, that tendency is reduced to the minimum, since the strain is exerted crosswise of the diagonal scores.

It will also be apparent that by forming the junction-bar 8 as a series of V-shaped sections, the strains on the hook are divided by the diagonal bar-sections diverging from each arm and are distributed over the two arms extending from the ends of these diverging sections, thereby adding greatly to the strength of the hook over one wherein the strain is exerted straightway throughout opposite arms.

What I claim as new and desire to secure by Letters Patent is:—

1. A belt-fastener comprising a bar formed of diagonally-extending sections forming apexes alternately on opposite edges of the bar and having diagonal scores in one face, arms of varying length on each edge of the bar extending from the successive apexes, the arms on one edge of the bar being bent on themselves between their ends to extend along the spaces between the arms on the opposite edge thereof, and prongs on the outer ends of the arms.

2. A belt-fastener comprising a bar formed of diagonally-extending sections forming apexes alternately on opposite sides of the bar, arms extending from opposite edges of the bar, the arms on one edge being bent on themselves between their ends to extend along the spaces between the arms on the opposite edge, and a pair of prongs on the outer end of each arm having the members folded toward each other on diagonal outwardly converging lines, at the junctions between the prongs of each pair and the respective arm, whereby in the driving of the prongs the members of each bar are caused to spread outwardly at their end portions and to be self-clenched in spread condition against the adjacent belt surface.

3. A belt-fastener comprising a bar formed of diagonally extending sections forming apexes alternately on opposite edges of the bar, arms of varying length extending from the successive apexes, the arms on one edge of the bar being bent on themselves between their ends to extend along the spaces between the arms on the opposite edge, and a pair of prongs on the outer end of each arm having the members folded toward each other on diagonal outwardly converging lines at the junctions between the prongs of each pair and the respective arm.

FRANK M. LINDERMAN.

In presence of—
  A. C. FISCHER,
  F. A. FLORELL.